United States Patent [19]

Iwamoto

[11] Patent Number: 4,802,739

[45] Date of Patent: Feb. 7, 1989

[54] LIQUID CRYSTAL DISPLAY CONTROL DEVICE

[75] Inventor: Yoshihiro Iwamoto, Kawasaki, Japan

[73] Assignee: Kabushiki Kaisha Toshiba, Kawasaki, Japan

[21] Appl. No.: 833,233

[22] Filed: Feb. 27, 1986

[30] Foreign Application Priority Data

Jun. 7, 1985 [JP] Japan ................................ 60-122805

[51] Int. Cl.[4] .......................... G02F 1/13; G06F 3/14; H02M 7/25

[52] U.S. Cl. .................................... 350/332; 307/110; 320/1; 363/60

[58] Field of Search ........................... 350/332, 331 R; 340/784, 805, 811; 363/59, 60; 307/110, 246, 270, 296 A; 320/1

[56] References Cited

U.S. PATENT DOCUMENTS

| | | | |
|---|---|---|---|
| 3,599,144 | 8/1971 | Dressayre | 320/1 |
| 3,868,674 | 2/1975 | Lorteije | 350/332 |
| 3,961,840 | 6/1976 | Morokawa et al. | 350/332 |
| 4,050,064 | 9/1977 | Hashimoto et al. | 340/784 |
| 4,196,432 | 4/1980 | Chihara | 350/332 |
| 4,636,930 | 1/1987 | Bingham et al. | 307/110 |
| 4,712,876 | 12/1987 | Umeda et al. | 350/350 S |

FOREIGN PATENT DOCUMENTS

| | | | |
|---|---|---|---|
| 52-29925 | 3/1977 | Japan . | |
| 0148996 | 12/1978 | Japan | 340/784 |

OTHER PUBLICATIONS

B. Miller–"New Converter Sidesteps Second Power", pp. 48–49–Canadian Electronics Engineering–vol. 24, No. 5–1980.

*Primary Examiner*—Stanley D. Miller
*Assistant Examiner*—Tai Van Duong
*Attorney, Agent, or Firm*—Foley & Lardner, Schwartz, Jeffery, Schwaab, Mack, Blumenthal & Evans

[57] ABSTRACT

A liquid crystal display control device, in accordance with the present invention, for supplying a voltage signal to drive a liquid crystal display unit comprises a boosting circuit, and a segment signal circuit and/or a common signal circuit. The boosting circuit includes a dc power supply first capacitor connected between a plurality of first group switches and to be connected in parallel to said dc power supply when the first group switches are operated, a plurality of second group switches, second boosting capacitor connected between the other polarity of the dc power supply and one end of the other switch of the second group switches. One of the second group switches is connected between one polarity of the power supply and one end of the first capacitor. A third electronic switching means is connected to the boosting circuit in parallel to the second capacitor for discharging the voltage charged in the second capacitor.

Therefore, a voltage signal having a predetermined amplitude and polarity for driving the LCD display unit is charged in the second capacitor when the first and second switches are selectively operated and it is discharged when a power interruption occurs.

16 Claims, 5 Drawing Sheets

LIQUID CRYSTAL DISPLAY CONTROL DEVICE

BACKGROUND OF THE INVENTION

1. Field of the Invention

The present invention relates to a control device for a liquid crystal display (LCD) device, in particular, to an LCD device which is capable of preventing erroneous display that tends to be generated at the time of disconnecting the power supply.

2. Description of the Prior Art

A tendency exists in recent semiconductor devices to attempt to reduce the power consumption by stopping the feeding of power to the circuits that are not in operation.

For instance, among LCD devices for displaying desired content on the display unit, which receives the voltage necessary for driving the LCD from a boosting circuit that uses a capacitor and supplies the voltage to the LCD to be driven through operation of a plurality of switches, there are some that disconnect the power supply when there is no need to have a continued display of the content, inorder to reduce the power consumption.

However, in such an LCD device, discharge of a charged capacitor requires a certain length of time and the switches behave unstably due to temporary uncontrollability of the switches. Because of this, an LCD in the nonlighting condition is converted tot he lighting condition, for example, due to the residual voltage in the capacitor. Therefore, there arises an inconvenience in which there is temporarily displayed on the display unit a content which is different from what had been displayed before the power supply was disconnected. It means that there will be a problem, in particular when a display device or the like is constructed by using LCD. This is because when the power supply for the LCD is interrupted frequently, the above inconvenience will arise for each time the power supply is disconnected, giving displeasure to the use of the device.

SUMMARY OF THE INVENTION

An object of the present invention is to provide on LCD control device which is capable of stably and quickly erasing and displaying the display content at the time of discontinuation of the power supply to the LCD device.

Another object of the present invention is to provide an LCD control device which is capable of preventing erroneous display at the time of discontinuation of the power supply to the LCD device.

Still another object of the present invention is to provide an LCD control device which is capable of quickly erasing the display content without displaying a content which is different from the content that has been displayed on the LCD panel until the time of interruption of the power supply to the LCD device.

An LCD control device in accordance with the present invention is for supplying to an LCD a voltage necessary for driving the LCD unit, and comprises a boosting circuit, and a segment signal circuit and/or common signal circuit. The boosting circuit comprises a dc power supply, a first capacitor ($C_1$), which is connected between a dc power supply and a first group of switches ($SW_1$ and $SW_3$), that realizes a parallel connection with the dc power supply through operation of the first group of switches, a second group of switches ($SW_2$ and $SW_4$), and a second capacitor ($C_2$) which is connected between the other end of the dc power supply and one of the switch ($SW_4$) of the second group of switches. The other ($SW_2$) of the second group of switches is connected between one end of the dc power supply and the first capacitor. In additions, in the boosting circuit there is connected a third switch ($SW_5$) in parallel with the second capacitor for discharging the charges that are accumulated in the second capacitor.

These and other objects, features and advantages of the present invention will be more apparent from the following description of the preferred embodiments taken in conjunction with the accompanying drawings.

DETAILED DESCRIPTION OF THE PREFERRED EMBODIMENTS

Figure 1:
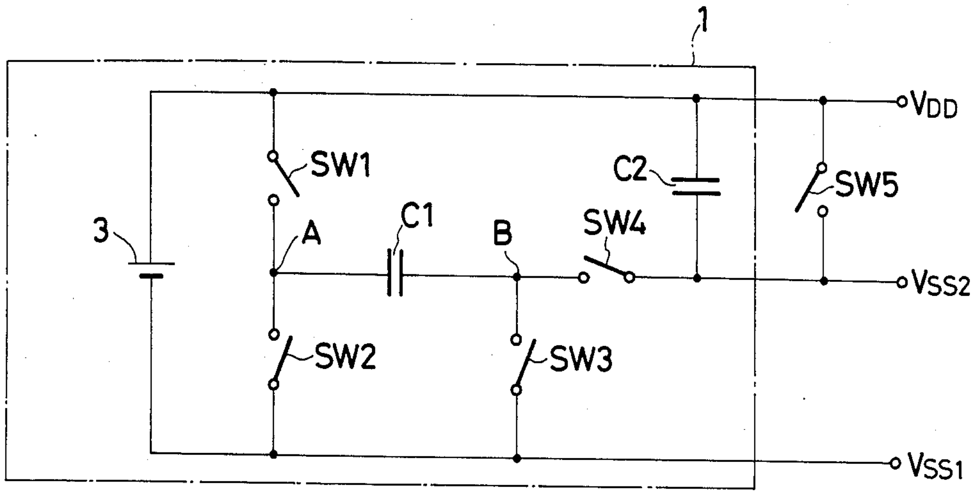
FIG. 1 is a circuit diagram which shows the boosting circuit of an LCD control device embodying the present invention.

Referring to FIG. 1, the boosting circuit for the LCD control device embodying the present invention is shown with reference numeral 1. The boosting circuit 1 is a device for supplying a voltage which is necessary for driving the LCD that forms a display unit, and outputs a voltage of $-5V$ with negative polarity with respect to the electromotive force of a voltage source 3 by the use of the voltage source 3 with electromotive force $+5V$, for example.

The positive electrode of the voltage source 3 is connected to the $V_{DD}$ terminal and the negative terminal is connected to the $V_{SS1}$ terminal, and a switch $SW_1$ and a switch $SW_2$ that are connected in series are connected to the voltage source 3 in parallel. To the junction (called "point A" hereafter) of the switch $SW_1$ and the switch $SW_2$ is connected one end of a capacitor $C_1$, and to the other end (called "point B" hereafter) of the capacitor $C_1$ is connected to one end of a switch $SW_3$ whose other end is connected tot he $V_{SS1}$ terminal as well as one end of a switch $SW_4$ whose other end is connected to the $V_{SS2}$ terminal. Further, a boosting capacitor $C_2$ is connected between the $V_{DD}$ terminal and the $V_{SS2}$ terminal, and a switch $SW_5$ for short-circuiting both ends of the boosting circuit $C_2$ is connected in parallel with the boosting capacitor $C_2$, in order to discharge the voltage accumulated in the boosting capacitor $C_2$.

Figure 2:
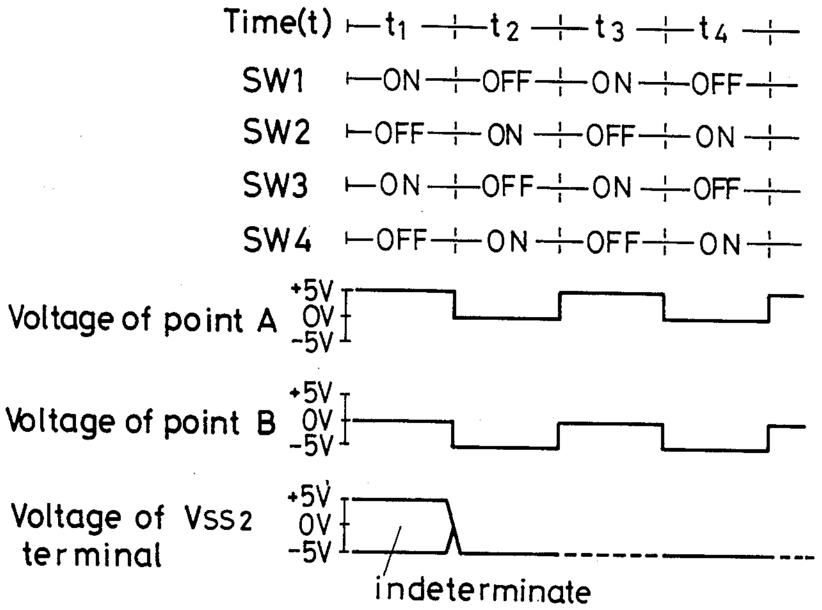
FIG. 2 illustrates the time charts of the operation of the boosting circuit shown in FIG. 1.

Next, the operation of the boosting circuit 1 shown in FIG. 1 will be described by referring to FIG. 2. In FIG. 2, first at time $t_1$ the switch $SW_1$ and the switch $SW_3$ are in conducting state while the switch $SW_2$, the switch $SW_4$, and the switch $SW_5$for short-circuiting are in nonconducting state. At the same time, one end, point A, of the capacitor $C_1$ is connected to the $V_{DD}$ terminal via the switch $SW_1$ while the other end, point B, of the capacitor $C_1$ is connected to the $V_{SS1}$ terminal via the switch $SW_3$. In such a state, the capacitor $C_1$ is charged by the voltage of +5V with the point A side as positive and the point B side as negative. Further, the voltage level of the $V_{SS2}$ terminal becomes indeterminate because of the nonconducting state of the switch $SW_4$ and the switch $SW_5$. Next, at time $t_2$, the switch $SW_1$ and the $SW_3$ change from the conducting state to the nonconducting state, the switch $SW_2$ and the switch $SW_4$ change from the nonconducting state to the conducting state, and one end, point A, of the capacitor $C_1$ is connected to the $V_{SS1}$ terminal via the switch $SW_2$ while the other end, point B, of the capacitor $C_1$ is connected to the $V_{SS2}$ terminal via the switch $SW_4$. Therefore, in such a state, the voltage of the point A changes from +5V to 0V so that the voltage of the point B is pressed down from 0V to −5V, and a voltage of −5V is output at the $V_{SS2}$ terminal. Then, a voltage of +5V is impressed to one end which is connected on the $V_{DD}$ terminal side of the boosting capacitor $C_2$, and a voltage of −5V is impressed on the other end which is connected on the $V_{SS2}$ terminal side. Therefore, a voltage of 10V is charged on the boosting capacitor $C_2$, with its one end positive and the other end negative.

Next, at time $t_3$, the switch $SW_1$ and the switch $SW_3$ change from the nonconducting state to the conducting state while the switch $SW_2$ and the switch $SW_4$ change from the conducting state to the nonconducting state, which are the same conditions as at time $t_1$. Here again, a voltage of +5V is charged with the point A side of the capacitor $C_1$ positive and its point B side negative. Then, although the switch $SW_4$ is in the nonconducting state in this condition, the voltage that was charged on the boosting capacitor $C_2$ at time $t_2$, as represented by the dotted line in FIG. 2, is held dynamically as is so called, such that the $V_{SS2}$ terminal will be held at approximately −5V. After time $t_4$, the situations at times $t_2$ and $t_3$ are repeated, and a voltage of −5V is output at the $V_{SS2}$ terminal, making it possible to obtain a voltage of −5V of negative polarity with respect to the voltage source 3 with an electromotive force +5V.

Figure 3:
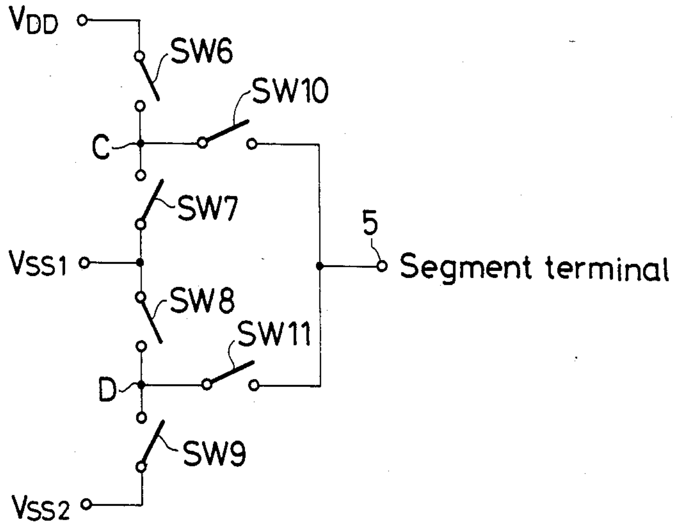
FIG. 3 is a circuit diagram of the segment signal circuit for switching the boosting voltage that is output from the boosting circuit of the LCD control device embodying the present invention.
Figure 4:
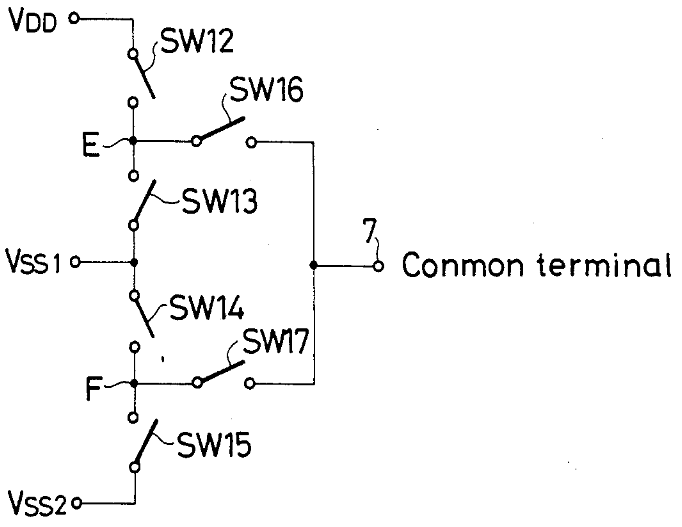
FIG. 4 is a circuit diagram of the common signal circuit for switching the boosting voltage that is output from the boosting circuit of the LCD control device embodying the present invention.
Figure 5:
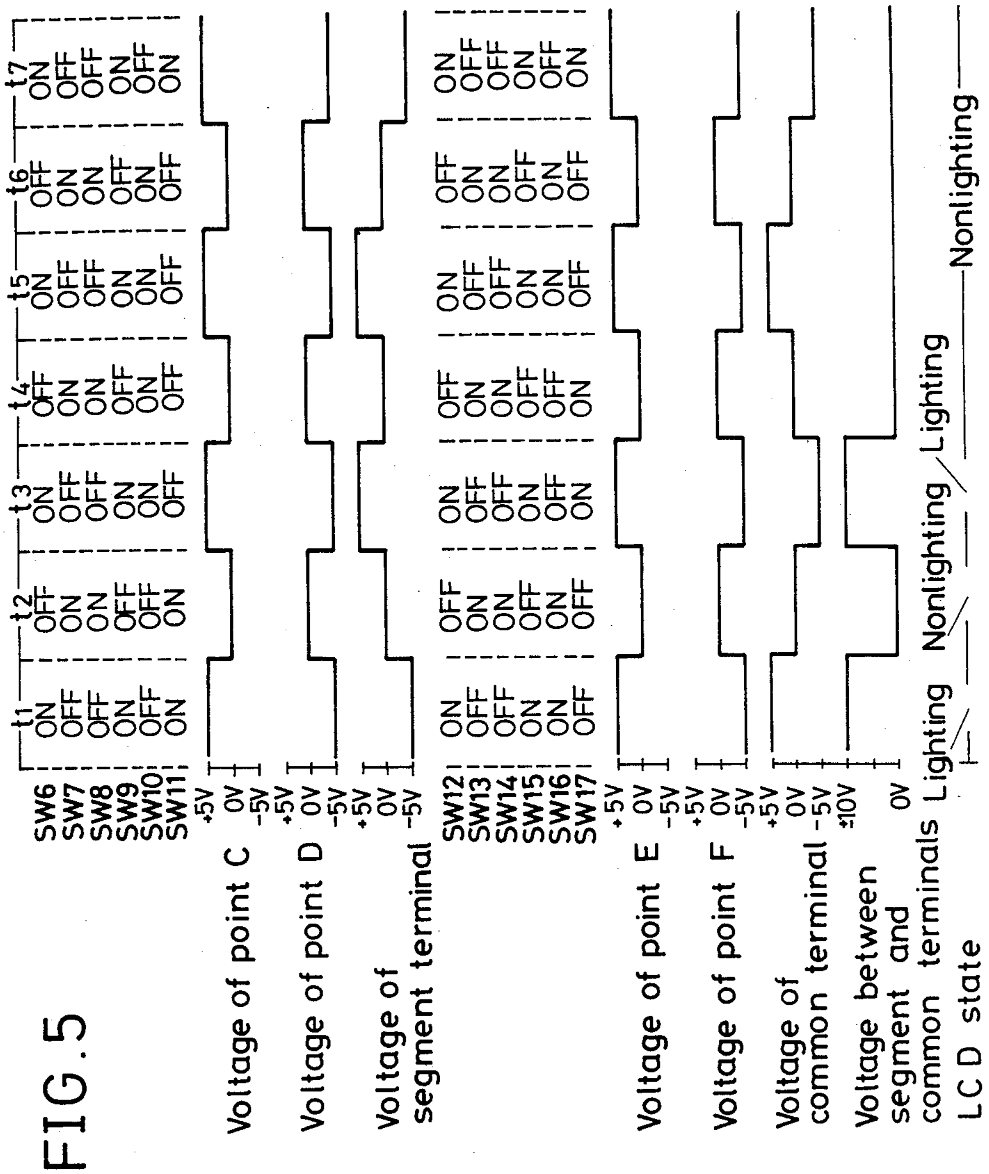
FIG. 5 is a diagram for explaining the operation of the segment signal circuit and the common signal circuit shown in FIGS. 3 and 4, respectively.

FIG. 3 illustrates the construction of the segment signal circuit that gives to the LCD segment voltage necessary for driving the LCD, by switching the voltage that is output from the boosting circuit. FIG. 4 illustrates the construction of the common signal circuit that gives to the LCD common voltage necessary for driving the LCD, by switching the voltage that is output from the boosting circuit 1. FIG. 5 is a diagram for illustrating the operation of the segment signal circuit and the common signal circuit shown in FIGS. 3 and 4, respectively. In FIG. 3, the segment signal circuit is constructed by switch $SW_6$ through switch $SW_{11}$. To one end (called "point C" hereafter) of the switch $SW_6$ whose the other end is connected to the $V_{DD}$ terminal of the boosting circuit 1, there are connected one end of the switch $SW_7$ whose the other end is connected to the $V_{SS1}$ terminal of the boosting circuit, as well as one end of the swithc $SW_{10}$ whose the other end is connected to the segment terminal. Moreover, to one end (called "point D" hereafter) of the switch $SW_9$ whose the other end is connected to the $V_{SS2}$ terminal of the boosting circuit 1, there are connected one end of the switch $SW_8$ whose the other end is connected to the $V_{SS1}$ terminal, as well as one end of the switch $SW_{11}$ whose the other end is connected to the segment terminal. By appropriately closing and opening the switches $SW_6$ through $SW_{11}$ that are connected in the above manner, each of the output voltages +5V, 0V, and −5V of the boosting circuit 1 is arranged to be output from the segment terminal.

In FIG. 4, the common signal circuit is constructed by switches $SW_{12}$ through $SW_{17}$. To one end (called "point E" hereafter) of the switch $SW_{12}$ whose the other end is connected to the $V_{DD}$ terminal of the boosting circuit 1, there are connected one end of the switch $SW_{13}$ whose the other end is connected to the $V_{SS1}$ terminal of the boosting circuit 1, as well as one end of the switch $SW_{16}$ whose the other end is connected to the common terminal. Further, to one end (called "point F" hereafter) of the switch $SW_{15}$ whose the other end is connected to the $V_{SS2}$ terminal of the boosting circuit 1, there are connected one end of the switch $SW_{14}$ whose the other end is connected to the $V_{SS1}$ terminal of the boosting circuit 1, as well as one end of the switch $SW_{17}$ whose the other end is connected to the common terminal. Through appropriate closing and opening of the switches $SW_{12}$ through $SW_{17}$ that are connected as in the above, there can be output from the common terminal each of the output voltages +5V, 0V, and −5V of the boosting circuit 1.

Next, referring to FIG. 5, the operation of the segment signal circuit shown in FIG. 3 and of the common signal circuit shown in FIG. 4 will be described.

The opening and closing at each of the times $t_1$ through $t_7$ of the switches $SW_6$ through $SW_{11}$ of the segment signal circuit and the switches $SW_{12}$ through $SW_{17}$ of the common signal circuit are controlled, for example, as shown by the figure, and the voltage that is output from the common terminal is varied with fixed cycle, for example, as +5V→0V→−5V→0V→+5V. By varying the segment terminal voltage in response to the common terminal voltage through charge of the voltage between the common and the segment terminals, lighting and nonlighting of the LCD can be accomplished.

For example, at time $t_1$, the switches $SW_{12}$, $SW_{15}$, and $SW_{16}$ of the common signal circuit are in the conducting state while the switches $SW_{13}$, $SW_{14}$, and $SW_{17}$ are in the nonconducting state, so that the common terminal is connected to the $V_{DD}$ terminal via the switches $SW_{12}$ and $SW_{16}$ and a voltage of +5V is output on the common terminal. On the other hand, the switches $SW_6$, $SW_9$, and $SW_{11}$ of the segment signal circuit are in the conducting state while the switches $SW_7$, $SW_8$, and $SW_{10}$ are in the nonconducting state, so that the segment terminal is connected to the $V_{SS2}$ terminal via the switches $SW_9$ and $SW_{11}$ and a voltage of $-5V$ is output on the segment terminal. Consequently, the voltage between the segment and the common terminals becomes 10V, which is supplied (to the LCD to light up the LCD. Next, at time $t_2$,) for example, the switches $SW_{12}$ and $SW_{15}$ of the common signal circuit are changed from the conducting state to the nonconducting state while the switches $SW_{13}$ and $SW_{14}$ of the some circuit are changed from the nonconducting state to the conducting state, so that the common terminal is connected to the $V_{SS1}$ terminal via the switches $SW_{13}$ and $SW_{16}$ and the common terminal voltage becomes 0V. On the other hand, the switches $SW_6$ and $SW_9$ of the segment signal circuit are changed from the conducting state to the nonconducting state while the switches $SW_7$ and $SW_8$ of the same circuit are changed from the nonconducting state to the conducting state, so that the segment terminal is connected to the $V_{SS1}$ terminal and the segment terminal voltage become 0V. Consequently, the voltage between the segment and the common terminals becomes 0V and the LCD will find itself in the nonlighting condition.

Analogous situations taking place for time to and thereafter, desired display can be accomplished by realizing the lighting and nonlighting conditions for the LCD according to the following manner. Namely, the LCD is brought to a lighting condition by generating a voltage of 10V between the segment and the common terminals through control of the opening and closing of each of the switches $SW_6$ through $SW_{17}$ of the segment signal circuit and the common signal circuit. Similarly, the LCD may be brought to a nonlighting condition by adjusting to have a voltage of 0V impressed between the segment and the common terminals through control of the opening and closing of each of the switches $SW_6$ through $SW_{17}$.

When the power supply of an LCD control device constructed as above is disconnected, the switches $SW_6$ through $SW_{17}$ may become uncontrollable temporarily and behave unstably. However, even under such a condition, by changing the switch $SW_5$ from the nonconducting state to the conducting state by means of a control signal, such as a power supply shut-off signal or a display erasure instruction signal both ends of the boosting capacitor $C_2$ that is connected in parallel with the switch $SW_5$ can be short-circuited and the charge that was accumulated on the boosting capacitor $C_2$ will be discharged. Therefore, between the segment terminal and the common terminal there will not be output a residual voltage, such as the voltage of 10V which is necessary for lighting up the LCD. Therefore, when the power supply is disconnected the content which has been displayed can be erased without, for example, switching of the nonlighting condition of the LCD to the lighting condition with the temporary display of a content which is different from the content that has been displayed on the display unit until that time.

Figure 6:
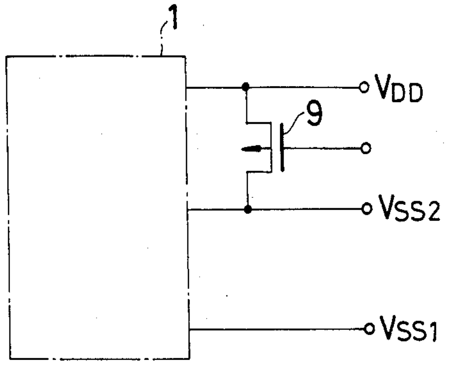
FIG. 6 is a circuit diagram which shows the boosting circuit for a second embodiment of the LCD control device in accordance with the present invention.

FIG. 6 shows the boosting circuit of the LCD control device for a second embodiment of the invention. A special feature of the circuit is to connect a MOS type P-channel transistor in parallel with the boosting capacitor $C_2$ of the boosting circuit 1 shown in FIG. 1. It discharges the charges that were accumulated on the boosting capacitor $C_2$ by short-circuiting both ends of the boosting capacitor $C_2$ through conversion of the P-channel transistor from the nonconducting condition to the conducting condition by the use of the same control signal that is used for controlling the switch $SW_5$. Therefore, by constructing the circuit as in the above it becomes possible to obtain effects that are similar to those of the first embodiment. In the above, the component with the same symbol as in FIG. 1 signifies the same item, and its description has been omitted.

Figure 7:
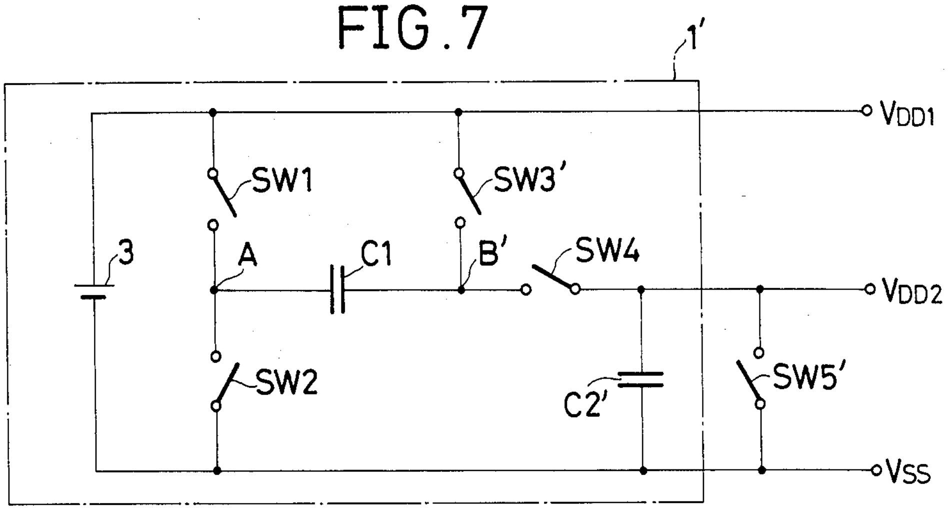
FIG. 7 is a circuit diagram which shows the boosting circuit for a third embodiment of the LCD control device in accordance with the present invention.

FIG. 7 shows the boosting circuit of the LCD control device for a third embodiment of the present invention. In contrast to the boosting circuit 1 shown in FIG. 1 which outputs a boosted voltage of negative polarity with respect to the voltage source 3, the boosting circuit 1' shown in FIG. 7 outputs a boosted voltage of positive polarity with respect to the voltage source 3. The boosting circuit 1' is constituted by a switch $SW_3$ connected between the $V_{DD1}$ terminal and one end (called "point B'" herafter) of the capacitor $C_1$ which is connected to one end of the switch $SW_4$, a boosting capacitor $C_2'$ which is connected between the other end of the switch $SW_4$ that is connected to the $V_{DD2}$ terminal side and the $V_{SS}$ terminal, and a switch $SW_5'$ which is connected in parallel with the boosting capacitor $C_2'$. The components with the same symbols as in FIG. 1 represent the same items as in FIG. 1, and the explanation on them is omitted.

In a boosting circuit 1' of the above construction, first, the switch $SW_2$ and the switch $SW_3'$ are in the conducting state, the switch $SW_1$ and the switch $SW_4$ are in the nonconducting state, and the capacitor $C_1$ is charged to a voltage of $+5V$ with negative charge on the point A side and positive charge on the point B' side. Next, the switch $SW_1$ and the switch $SW_4$ are changed from the nonconducting state to the conducting state, and the switch $SW_2$ and the switch $SW_3'$ are changed from the conducting state to the nonconducting state. By raising the voltage at point A from 0V to $+5V$, the voltage at point B' is raised from $+5V$ to $+10V$, which changes the boosting capacitor $C_2'$ to a voltage of $+10V$ and the boosted voltage of $+10V$ is output at the $V_{DD2}$ terminal. Then, when the power supply to the LCD device is disconnected the switch $SW_5'$ of the boosting circuit 1', analogous to the switch $SW_5$ of the boosting circuit 1, changes from the nonconducting state to the conducting state, and the charges accumulated on the boosting capacitor $C_2'$ are discharged by the short-circuiting of both ends of the boosting capacitor $C_2'$.

Therefore, also in the case of driving the LCD by the use of the boosting circuit 1' that outputs a boosting voltage of positive polarity with respect to the voltage source 3, it becomes possible when the power supply to the LCD device is disconnected to obtain similar effects as in the first embodiment, through connection of the switch $SW_5'$ in parallel with the boosting capacitor $C_2'$ of the boosting circuit 1'.

Figure 8:
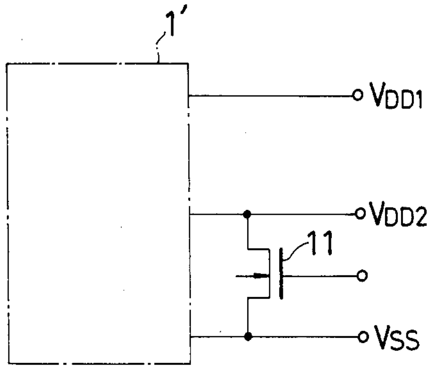
FIG. 8 is a circuit diagram which shows the boosting circuit for a fourth embodiment of the LCD control device in accordance with the present invention.

FIG. 8 shows the boosting circuit of the LCD control device relating to a fourth embodiment of the invention. A special feature of the device is to connect a MOS type N-channel transistor 11 in parallel with the boosting capacitor C2' of the boosting circuit 1' shown in FIG. 7. When the power supply to the LCD device is disconnected, the N-channel transistor 11 is changed from the nonconducting state to the conducting state by means of the same controlling signal that is used for controlling the switch $SW_5'$, to discharge the charges accumulated on the boosting capacitor $C_2'$ by short-circuiting both ends of the boosting capacitor $C_2'$. By constructing the device as in the above it becomes possible to obtain the same effects as in the first embodiment. In the above, the components with the same symbols as in FIG. 7 represent the same items explanation of which has been omitted.

Figure 9:
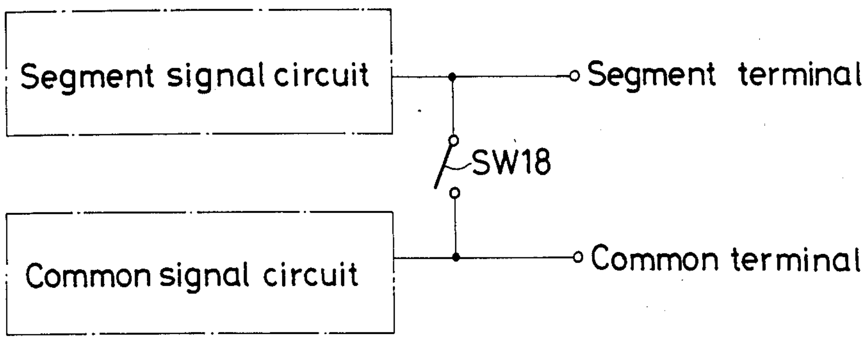
FIG. 9 is a circuit diagram which shows the segment and common signal circuits for a fifth embodiment of the LCD control device in accordance with the present invention.

FIG. 9 shows the LCD control device relating to a fifth embodiment of the present invention. A special feature of the device consists in connecting a switch $SW_{18}$ between the segment terminal of the segment signal circuit shown in FIG. 3 and the common terminal of the common signal circuit shown in FIG. 4. When the power supply to the LCD device is disconnected, the voltage between the segment and the common terminals is made to be less than the voltage for realizing display by liquid crystal, by connecting the segment terminal and the common terminal through change of the switch $SW_{18}$ to the conducting state. With this construction, it becomes possible to erase the content that had been displayed, without displaying a content which is different from what has been displayed on the LCD control device.

Figure 10:
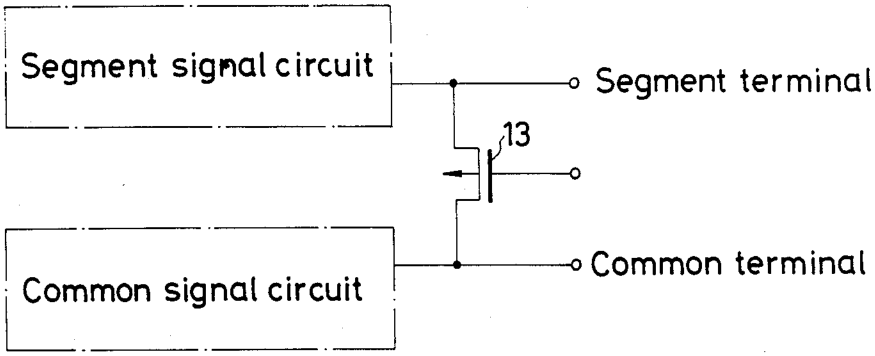
FIG. 10 is a circuit diagram which shows the segment and common signal circuits for a sixth embodiment of the LCD control device in accordance with the present invention.

FIG. 10 shows the LCD control device relating to a sixth embodiment of the present invention. A special feature of the device is that there is connected a MOS type P-channel transistor 13 between the segment terminal and the common terminal as means of short-circuiting the segment terminal and the common terminal at the time of disconnection of the power supply to the LCD device. When the power supply is disconnected, the voltage between the segment and the common terminals is arranged to be reduced to a value which is less than the voltage required for realizing a display by liquid crystal, by changing the P-channel transistor from the nonconducting state to the conducting state. With such a construction, effects that are similar to the fifth embodiment will become possible to be obtained.

Figure 11:
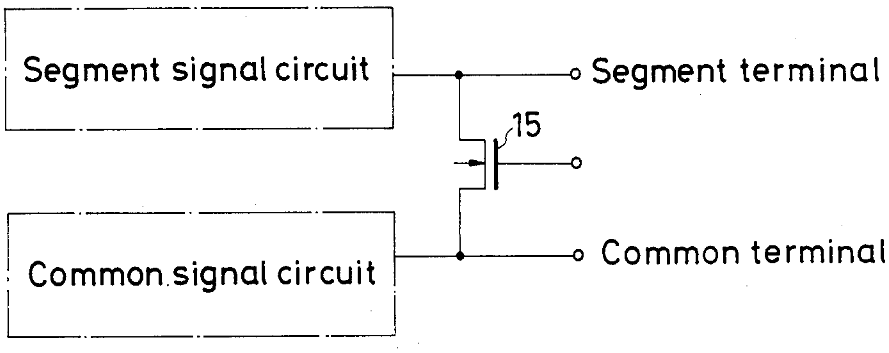
FIG. 11 is a circuit diagram which shows the segment and common signal circuits for a seventh embodiment of the LCD control device in accordance with the present invention.

FIG. 11 shows the LCD control device relating to a seventh embodiment of the present invention. A special feature of the device is that there is connected a MOS type N-channel transistor 15 between the segment terminal and the common terminal as means of short-circuiting the segment and the common terminals at the time of disconnection of the power supply to the LCD device. When the power supply is disconnected, the voltage between the segment and the common terminals is arranged to be reduced to a value which is less than the voltage required for realizing a display by liquid crystal, by changing the N-channel transistor from the nonconducting state to the conducting state. With such a construction, effects that are similar to the fifth embodiment will become possible to be obtained.

It should be noted that although the boosting circuit described in the first and the third embodiments is one that outputs a boosted voltage which is twice as large the voltage of the voltage source, it is of course possible according to the present invention to obtain similar effects by the use of an LCD device which uses a boosting circuit that outputs a boosting voltage that is $2+N$ ($N \geqq 1$) times that of the power supply.

In summary, according to the present invention, it is arranged, when disconnecting the power supply, to discharge quickly the charges that were accumulated on the capacitor for obtaining a voltage that is necessary to drive and display liquid crystal, by carrying out charging and discharging through control of feeding. Therefore, it is possible to provide an LCD control device which is capable, at the time of disconnection of the power supply, of quickly erasing the displayed content, without displaying a content which is different from what has been displayed on the liquid display panel.

What is claimed is:

1. A control device for a liquid crystal display unit, comprising:
(a) a boosting circuit having;
a dc power supply,
charging and discharging means,
feeding means for supplying to the liquid crystal display unit a voltage which is necessary to drive and display liquid crystal by controlling the charge and discharge of said charging and discharging means by selectively coupling said charging and discharging means to said dc power supply, and
(b) switching means connected to said charging and discharging means for discharging the charges that are accumulated in said charging and discharging means to prevent erroneous display on the liquid crystal display unit when a power interruption occurs.

2. A control device for a liquid crystal display (LCD) unit, comprising:
(a) a boosting circuit including a dc power supply, charging and discharging means, and feeding means for supplying to the liquid crystal display unit a voltage which is necessary to drive the liquid crystal display by controlling the charge and discharge of said charging and discharging means;
wherein said feeding means comprises a first group of switches and a second group of switches, said charging and discharging means comprises a first capacitor and a second boosting capacitor, the first capacitor is connected between the first group of switches so as to be connected in parallel with said dc power supply by the action of the first group of switches, a first switch of the second group of switches is connected between one end of said dc power supply and one end of said charging and discharging means, and the second capacitor is connected between the other end of said dc power supply and one end of a second switch of the second group of switches;
(b) switching means connected in parallel with said second capacitor for discharging the charges that are accumulated in said second capacitor in response to a control signal indicative of a power interruption to prevent erroneous display on the liquid crystal display unit when a power interruption occurs.

3. A liquid crystal display control device as claimed in claim 2, in which said second boosting capacitor is connected between positive electrode terminal (+) of said dc power supply and one end of the first switch of the second group switches for obtaining an LCD control device with negative polarity.

4. A liquid crystal display control device as claimed in claim 2, in which said second boosting capacitor is connected between a negative electrode terminal (−) of said dc power supply and one end of the first switch of the second group switches for obtaining an LCD control device with positive polarity.

5. A liquid crystal display control device as claimed in claim 3, in which said second boosting capacitor can store an absolute voltage of 10V when said dc power supply is 5V.

6. A liquid crystal display control device as claimed in claim 4 in which said second boosting capacitor can store an absolute voltage of 10V when said dc power supply is 5V.

7. A liquid crystal display control device as claimed in claim 3, in which said switching means is a MOS type P-channel transistor.

8. A liquid crystal display control device as claimed in claim 3, in which said switching means is a MOS type P-channel transistor.

9. A liquid crystal display control device as claimed in claim 2, in which said switching means is a MOS type N-channel transistor.

10. A liquid crystal display control device as claimed in claim 4, in which said switching means is a MOS type N-channel transistor.

11. A control device for liquid crystal display (LCD) unit, comprising:

(a) a boosting circuit including a dc power supply, charging and discharging means, and feeding means for supplying to the liquid crystal display unit a voltage which is necessary to drive the liquid crystal display by controlling the charge and dischargee of said charging and discharging means;

wherein said feeding means comprises a first group of switches and a second group of switches, said charging and discharging means comprises a first capacitor and a second boosting capacitor, the first capacitor is connected between the first group of switches so as to be connected in parallel with said dc power supply by the action of the first group of switches, a first switch of the second group of switches is connected between one end of said dc power supply and one end of said charging and discharging means, and the second capacitor is connected between the other end of said dc power supply and one end of a second switch of the second group of switches;

(b) switching means connected in parallel with said second capacitor for discharging the charges that are accumulated in said second capacitor in response to a control signal indicative of a power interruption to prevent erroneous display on the liquid crystal display unit when a power interruption occurs; and (c) a segment signal circuit for producing a necessary segment voltage so as to drive the LCD display unit, said segment signal circuit having a first segment switching means, a second segment switching means, and a third segment switching means, connected to said boosting circuit and selectively turned ON and OFF in accordance with predetermined first conditions of operation, so as to produce a segment terminal voltage at an output terminal of said segment signal circuit.

12. A liquid crystal display control device as claimed in claim 11, further comprising:

a common signal circuit for producing a necessary common voltage so as to drive the LCD unit, said common signal circuit having a first common switching means, a second common switching means, and a third common switching means, connected to said boosting circuit and selectively turned ON and OFF in accordance with a predetermined second condition of operation, so as to produce a common terminal signal at an output terminal of said common signal circuit.

13. A liquid crystal display control device as claimed in claim 12, the output terminals of said segment signal circuit and said commone signal circuit are connected to each other through electronic switching means, so as to reduce the voltage between the segment terminal and the common terminal below a possible enable voltage for energizing the LCD display unit.

14. A liquid crystal display control device as claimed in claim 13, in which said electronic switching means is either a MOS type P-channel transistor or a MOS type N-channel transistor.

15. A liquid crystal display control device for controlling a liquid crystal display unit, comprising:

(a) a boosting circuit including;

a dc power supply;

first capacitor means connected between a plurality of first group switches and connected in parallel to said dc power supply when said first group switches are operated, a plurality of second group switches, a first switch of said second group switches being connected between one polarity of said dc power supply and one end of said first capacitor means, and second boosting capacitor means connected between the other polarity of said dc power supply and one end of a second switch of the second group switches, and (b) a third electronic switching means connected in parallel to the second boosting capacitor means;

whereby a voltage signal having a predetermined amplitude and polarity for driving the LCD display unit is charged in said second capacitor means when said first and second group switches are selectively operated and is discharged by said third electronic switching means in response to a control signal indicative of a power interruption to prevent erroneous display on the liquid crystal display unit when a power interruption occurs.

16. A control device for a liquid crystal display unit including a boosting circuit having a dc power supply, a first capacitor and a second boosting capacitor, and feeding means for supplying to the liquid crystal display unit a voltage which is necessary to drive the liquid crystal display unit by controlling the charge and discharge of the first and second capacitors, said feeding means comprising first, second, third, and fourth switches, the first capacitor being connected between the first switch and third switch so as to be connected in parallel with said dc power supply, the second switch being connected between one end of said dc power supply and one end of the first capacitor, the second capacitor being connected between the other end of said dc power supply and one end of the fourth switch, and the other end of the first capacitor being connected to the other end of the fourth switch, the improvement comprising:

a fifth switch connected in parallel with the second capacitor for discharging the charges that are accumulated in the second capacitor in response to a control signal indicative of a power interruption to prevent erroneous display on the liquid crystal display unit when a power interruption occurs.

* * * * *